(12) United States Patent
Zhang

(10) Patent No.: US 8,750,436 B2
(45) Date of Patent: Jun. 10, 2014

(54) METHOD AND APPARATUS FOR CHANNEL ESTIMATION

(75) Inventor: Yun Zhang, Shanghai (CN)

(73) Assignee: Omnivision Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/597,202

(22) Filed: Aug. 28, 2012

(65) Prior Publication Data

US 2013/0272343 A1   Oct. 17, 2013

(30) Foreign Application Priority Data

Apr. 13, 2012   (CN) .......................... 2012 1 0109435

(51) Int. Cl.
  *H03D 1/00*   (2006.01)
(52) U.S. Cl.
  USPC ........................... 375/343; 375/130; 375/316
(58) Field of Classification Search
  USPC ......................................... 375/130, 316, 343
  See application file for complete search history.

(56) References Cited

U.S. PATENT DOCUMENTS

| 7,742,548 | B2 * | 6/2010 | Ramaswamy et al. ........ 375/343 |
| 2004/0032825 | A1 * | 2/2004 | Halford et al. ................ 370/208 |
| 2004/0052306 | A1 * | 3/2004 | Ibrahim et al. ................ 375/152 |
| 2004/0264607 | A1 * | 12/2004 | Lewis ........................... 375/343 |
| 2005/0152317 | A1 * | 7/2005 | Awater et al. ................. 370/338 |
| 2010/0002812 | A1 * | 1/2010 | Steele et al. .................. 375/343 |
| 2011/0268171 | A1 * | 11/2011 | Lee et al. ...................... 375/229 |

* cited by examiner

*Primary Examiner* — Chieh M Fan
*Assistant Examiner* — Freshteh N Aghdam
(74) *Attorney, Agent, or Firm* — Blakely Sokoloff Taylor & Zafman

(57) ABSTRACT

Methods and apparatuses for channel estimation are disclosed. The method includes: converting −1's in a local Barker code to 0's; receiving a first preamble symbol output from a first Barker correlator and a second preamble symbol output from a second Barker correlator with a symbol determination module, the first preamble symbol being adjacent to the second preamble symbol; multiplying a result output from the symbol determination module with a correlation result output from the cyclic Barker correlator by using a multiplication module so as to obtain a channel estimation response; and receiving channel estimation responses with a time-domain channel data storage unit, and averaging them to obtain a noise-reduced channel estimation response. The channel estimation method and apparatus of the present invention can be achieved based on few hardware resources and low computation complexity.

6 Claims, 2 Drawing Sheets

METHOD AND APPARATUS FOR CHANNEL ESTIMATION

CROSS-REFERENCE TO RELATED APPLICATION

This application claims the priority of Chinese patent application number 201210109435.0, filed on Apr. 13, 2012, the entire contents of which are incorporated herein by reference.

TECHNICAL FIELD

The present invention relates to a communications field, and more particularly to a method and apparatus for channel estimation.

BACKGROUND

In wireless communication systems, inevitable influence of terrains or obstacles on signals causes the occurrence of multipath distortion. As a time-varying channel impulse response is generally modeled as a time-domain discrete finite impulse response (FIR) filter denoted by $$h(\tau; t) = \sum_n \alpha_n(t) e^{-j2\pi f_c \tau_n(t)} \delta(\tau - \tau_n(t)),$$

complex multipath interference always exists in received wideband signals, which appears as frequency selective fading in the frequency domain. For this reason, all receivers need to carry out an equalization operation to eliminate the multipath influence.

Generally, in a multipath channel, there will be a strongest path, called a main-path, which may be the earliest path or a path following several others. Paths earlier than the strongest path are defined as a forward path and those following the strongest path are defined as a backward path. The entire multipath transmission can be regarded as being composed of the forward path, the main-path and the backward path. These three components together determine the transmission performance of the system.

Shown in FIG. 1 is the frame structure of a 802.11b wireless LAN system. The frame mainly includes a preamble sequence, a frame header sequence and a data sequence. The preamble sequence is transmitted at 1 Mbps using differential binary phase shift keying (DBPSK) modulation and Barker code based spectrum spreading, followed by the frame header sequence, which may be transmitted at 1 Mbps using DBPSK modulation and Barker code based spectrum spreading, or at 2 Mbps using differential quadrature phase shift keying (DQPSK) modulation and Barker code based spectrum spreading. The portion of effective data may be transmitted either at 1 Mbps, 2 Mbps, 5.5 Mbps or 11 Mbps.

In 802.11b systems, channel estimation is often completed during the period of receiving the preamble. There are two kinds of preambles. The first one is referred to as short preamble and the second one is referred to as the long preamble. Duration of the long and short preamble is 144 μs and 72 μs, corresponding to 144 and 72 preamble bits, respectively. Further, preamble bit is composed of synchronous bit and check bit. Synchronous bit of a long preamble consists of 128 consecutive 1's, while that of a short preamble consists of 56 consecutive 0's. The length of check bit is 16 and check bits of a long and short preamble are different with each other. A receiver read a check bit to find whether the end of the current preamble is reached and whether the current preamble is a long or short one. Each preamble bit passes through a scrambling module such that any long string of consecutive 0' or 1' is eliminated and thus randomness of the preamble bit is strengthened. After that, the preamble bit is modulated according to the DBPSK modulation table (referring to Table 1) to generate a preamble symbol which has the same length with the preamble bit. Subsequently, each preamble symbol is spread with an 11-bit Barker code, $b_K$=[+1 −1 +1 +1 −1 +1 +1 +1 −1 −1 −1], and is transmitted thereafter. In such a way, after modulation and Barker code based spectrum spreading, preamble sequences transmitted at a rate of 11 Mbps are obtained from preamble data transmitted at a rate of 1 Mbps.

TABLE 1

| DBPSK Modulation Table | | |
| --- | --- | --- |
| Input Bit | 0 | 1 |
| Phase Change | 0 | π |

In a general case, channel estimation for an 802.11b system is achieved by cross-correlation of barker code, and the standard provides a Barker code auto-correlation function $$R(k) = \begin{cases} 11, k = 0 \\ -1, k \neq 0. \end{cases}$$

It could be found that the correlation function will give a peak wherever the start of a local Barker code is aligned with the start of a Barker code of a received sequence, otherwise less correction will be obtained.

Nevertheless, similar to other pseudo-random sequences, and also implied by the above auto-correlation function, a Barker code itself is not completely orthogonal, thus leading to impracticability of obtaining an accurate channel estimation response by directly carrying out the correlation with a local Barker code.

SUMMARY OF THE INVENTION

Accordingly, various aspects of present disclosure may provide a method and apparatus for channel estimation based on few hardware resources and a low computation complexity.

One aspect of present disclosure may provide a method of achieving sequence orthogonality, which includes:

converting symbols less in number in a first sequence to 0's so as to obtained a converted sequence which is referred to as a second sequence; and correlating a received sequence with the second sequence by using the local correlator and obtaining a correlation result that has a complete orthogonality, the correlation result being output by the local correlator.

Another aspect of present disclosure may provide a method for channel estimation, which includes:

converting −1's in a local Barker code to 0's to form a second Barker code, the local Barker code being stored on a cyclic Barker correlator;

receiving a first preamble symbol output from a first Barker correlator and a second preamble symbol output from a second Barker correlator by using a symbol determination module, the first preamble symbol being adjacent to the second preamble symbol;

multiplying a result output from the symbol determination module with a correlation result output from the cyclic Barker correlator by using a multiplication module so as to obtain a channel estimation response, and thereafter outputting the channel estimation response to a time-domain channel data storage unit; and receiving channel estimation responses output from the multiplication module with the channel data storage unit and averaging them to obtain a noise-reduced channel estimation response.

Another aspect of present disclosure may also provide an apparatus for channel estimation including a first Barker correlator, a second Barker correlator, a cyclic Barker correlator, a received data storage unit, a symbol determination module, a multiplication module and a time-domain channel data storage unit;

the first Barker correlator is configured to correlate a previous Barker sequence stored on the received data storage unit with a locally stored original Barker code and output a first preamble symbol to the symbol determination module;

the second Barker correlator is configured to correlate a next Barker sequence stored on the received data storage unit with a locally stored original Barker code and output a second preamble symbol to the symbol determination module;

the symbol determination module is configured to compare the received first preamble symbol with the received second preamble symbol and output the comparison result to the multiplication module;

the cyclic Barker correlator is configured to cyclically correlate a part sequence extracted from the previous and the next Barker sequences stored on the received data storage with a converted Barker code and output the correlation result to the multiplication module; the converted Barker code is formed by converting −1's in the locally stored original Barker code to 0's;

the multiplication module is configured to multiply the result output from the symbol determination module with the result output from the cyclic Barker correlator so as to obtain a channel estimation response and output the channel estimation response to the time-domain channel data storage unit; and the time-domain channel data storage unit is configured to average a plurality of obtained channel estimation responses to reduce the influence of noise therein.

By converting locally stored Barker codes before performing a cyclic correlation on them, the method and apparatus of the present disclosure are capable of obtaining a completely orthogonal correlation result, thus reducing the influence of noise on obtained channel estimation results and guaranteeing the accuracy thereof.

DETAILED DESCRIPTION

Figure 1:
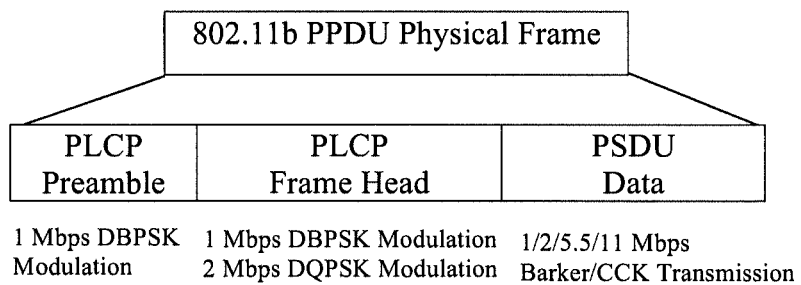
FIG. 1 is a diagram illustrating the structure of an 802.11b physical layer transmission frame.
Figure 2:
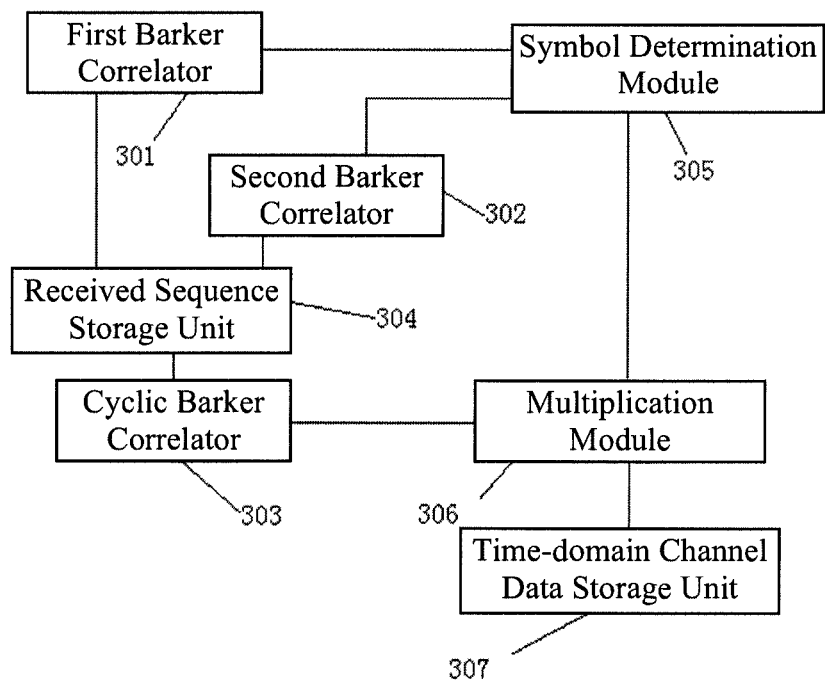
FIG. 2 is a schematic illustration of the structure of a channel estimation apparatus constructed in accordance with an embodiment of the present disclosure.

To clarify the present disclosure, the following description and the accompanying drawings illustrate the embodiments of the present disclosure.

Embodiment 1

This embodiment of present disclosure provides a method of achieving sequence orthogonality. The method includes the following steps:

Step 101: converting symbols less in number in a first sequence to 0's so as to obtained a converted sequence which is referred to as a second sequence; and Step 102: the local correlator correlates a received sequence with the second sequence and obtains a correlation result that has a complete orthogonality, the correlation result being output by the local correlator.

In another embodiment of present disclosure, converting the symbols less in number in the first sequence stored on the local correlator includes:

when symbols in the first sequence are +1's and −1's, converting −1's to 0's if the number of +1's is 1 greater than that of −1's; or converting +1's to 0's if the number of −1's is 1 greater than that of +1's.

In another embodiment of present disclosure, the first sequence is a Barker code or an m-sequence.

In the embodiment of present disclosure, the original Barker code can be processed by converting −1's in a local Barker code to 0's to form a converted local Barker code, and cyclically correlating the converted local Barker code with a received Barker code, in this way the non-complete-orthogonality in the correlation result can be eliminated without needing any further processing. In the embodiment, when the first sequence is an 802.11b Barker code, it shall be $b_k$=[+1 −1 +1 +1 −1 +1 +1 +1 −1 −1 −1], and accordingly the second sequence can be expressed as $g_k$=[+1 0 +1 +1 0 +1 +1 +1 0 0 0].

In practice, many other pseudo-random sequences, such as the most common m-sequences, can be processed in a similar way. An m-sequence is a periodic sequence in which each period has a length of $2^m-1$ and the difference under bipolar representation between total numbers of 1's and −1's in each period is one. For such an local m-sequence, before correlation is carried out, through converting −1's to 0's in the case that the number of +1's is one greater than that of −1's, or converting +1's to 0's in the case that the number of +1's is one less than that of −1's, a completely orthogonal correlation result can be obtained.

Embodiment 2

This embodiment of present disclosure provides a method for channel estimation which includes step 200, step 202, step 204 and step 206.

Step 200: converting −1's in a local Barker code to 0's to form a second Barker code; the local Barker code is stored on a cyclic Barker correlator.

In this step, if the originally stored local Barker code $b_k$ is [+1 −1 +1 +1 −1 +1 +1 +1 −1 −1 −1], the obtained converted Barker code $g_k$ will be [+1 0 +1 +1 0 +1 +1 +1 0 0 0].

Step 202: A symbol determination module receives a first preamble symbol output from a first Barker correlator and a second preamble symbol output from a second Barker correlator, wherein the first preamble symbol is adjacent to the second preamble symbol.

In a general case, channel estimation must be completed during the period of receiving the preamble. In other words, the receiver should have completed timing synchronization at the start time of channel estimation. In this step of the embodiment, it is assumed that the receiver is being synchronized to the strongest path, i.e., the system is at the exact time that after a received previous Barker sequence is correlated with a local Barker code in the first Barker correlator and a received next Barker sequence is correlated with another local Barker code in the second Barker correlator, the output two preamble symbols, namely, the first preamble symbol and the second preamble symbol, will be adjacent to each other.

In another embodiment of present disclosure, the first Barker correlator correlates the received previous Barker sequence with the local Barker code according to the formula, $$c_n = \sum_{k=0}^{L-1} b_k r_{n+k},$$

where L is the length of the local Barker code and L is equal to 11; $b_k$ (k=0, 1, . . . , L−1) stands for the local Barker code; and $r_{n+k}$ (k=0, 1, . . . , L−1) is the received previous Barker sequence.

In another embodiment of present disclosure, the second Barker correlator correlates the received next Barker code with the another local Barker code according to the formula, $$c_{n+L} = \sum_{k=0}^{L-1} b_k r_{n+L+k'},$$

where L is the length of the local Barker code and L is equal to 11; $b_k$ (k=0, 1, . . . , L−1) stands for the local Barker code; and $r_{n+L+k}$ (k=0, 1, . . . , L−1) is the received next Barker sequence.

Step 204: a multiplication module multiplies a result output from the symbol determination module with a correlation result output from the cyclic Barker correlator so as to obtain a channel estimation response, and outputs the channel estimation response to a time-domain channel data storage unit.

In still another embodiment of present disclosure, the result output from the symbol determination module is 0, +1, or −1, which is determined in the following manner:

when the first preamble symbol and the second preamble symbol are different from each other, the result output from the symbol determination module will be 0;

when both of the first preamble symbol and the second preamble symbol are −1, the result output from the symbol determination module will be −1; or when both of the first preamble symbol and the second preamble symbol are +1, the result output from the symbol determination module will be +1.

The cyclic Barker correlator is configured to cyclically correlate a part sequence extracted from the previous and the next Barker sequences with the converted Barker code (namely the second Barker code in step 200), which specifically includes:

extracting the last n (where n could be 0, 1, . . . , or L−1) consecutive elements from the previous Barker sequence and the first L−n consecutive elements from the next Barker sequences to form a part sequence; the part sequence has a length of n+(L−n)=L, which is the same as the length of a Barker code; the part sequence is denoted as $(r_0, r_1, \ldots, r_{L-1})$; and the cyclic Barker correlator correlates cyclically the locally converted second Barker code $g_k$ with the sequence $(r_0, r_1, \ldots, r_{L-1})$.

The above cyclic correlation is carried out according to the formula, $$h_n = \sum_{k=0}^{L-1} g_k r_{(k-n) \bmod(L)} (n = 0, 1, 2, \ldots, L-1),$$

where mod(L) stands for performing a modular operation on L; $g_k$ is the second Barker code which has been converted by a cyclic Barker correlator, and $g_k$ is [+1 0 +1 +1 0 +1 +1 +1 0 0 0].

It should be noted herein that in order to obtain correct channel estimation results with the method of the present disclosure, the two adjacent preamble symbols must be same, otherwise the output of the symbol determination module will be 0 and thus this part of the estimation result will be discarded. The two adjacent preamble symbols may both be −1 or +1, and the symbol determination module will accordingly output −1 or +1 for compensation.

Step 206: the time-domain channel data storage unit receives channel estimation responses output from the multiplication module and averages them to obtain a noise-reduced channel estimation response.

In this step, estimated channel estimation responses are input into the channel data storage unit and thereafter are accumulated and then averaged therein so as to effectively reduce the influence of noise and obtain more accurate channel estimation responses.

Figure 3:
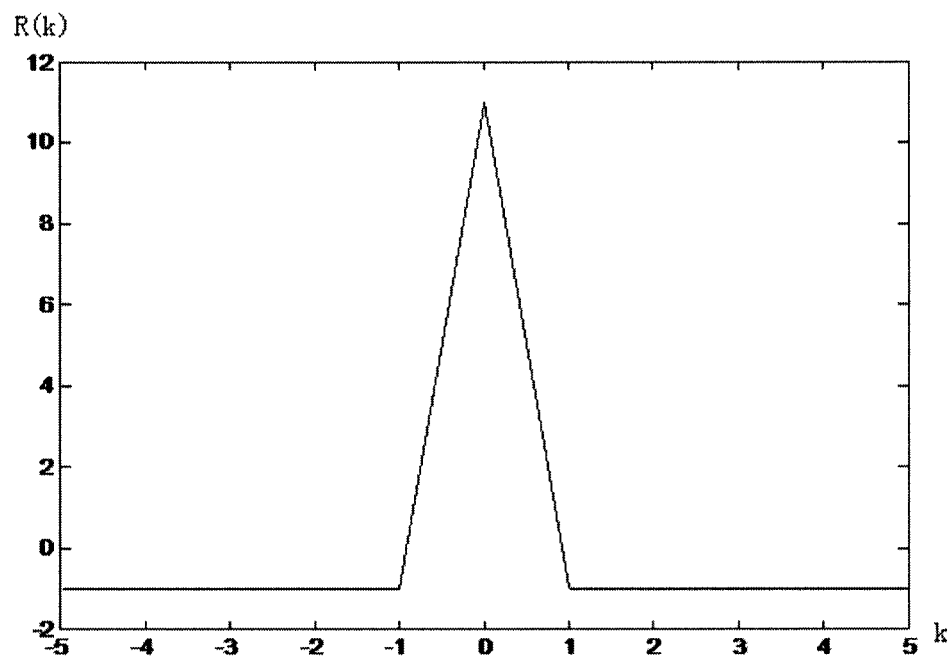
FIG. 3 is a diagram illustrating a correction result directly based on original Barker codes.

If channel estimation is performed with unconverted local Barker codes, i.e., correlation results of original Barker codes are directly used according to the formula $$h_n = \sum_{k=0}^{L-1} b_k r_{(k-n) \bmod(11)} (n = 0, 1, 2, \ldots, 10),$$

without eliminating the non-complete-orthogonality in Barker codes themselves, obtained correlation result will be that shown in FIG. 3, where, except for the point where there is a peak which is 11, values at other bits are all −1 but not 0, i.e., R(k) is 11 when k is equal to 0; and R(k) is −1 when k is equal to another value. Such problem also exists in auto-correlations of other pseudo-random sequences.

Figure 4:
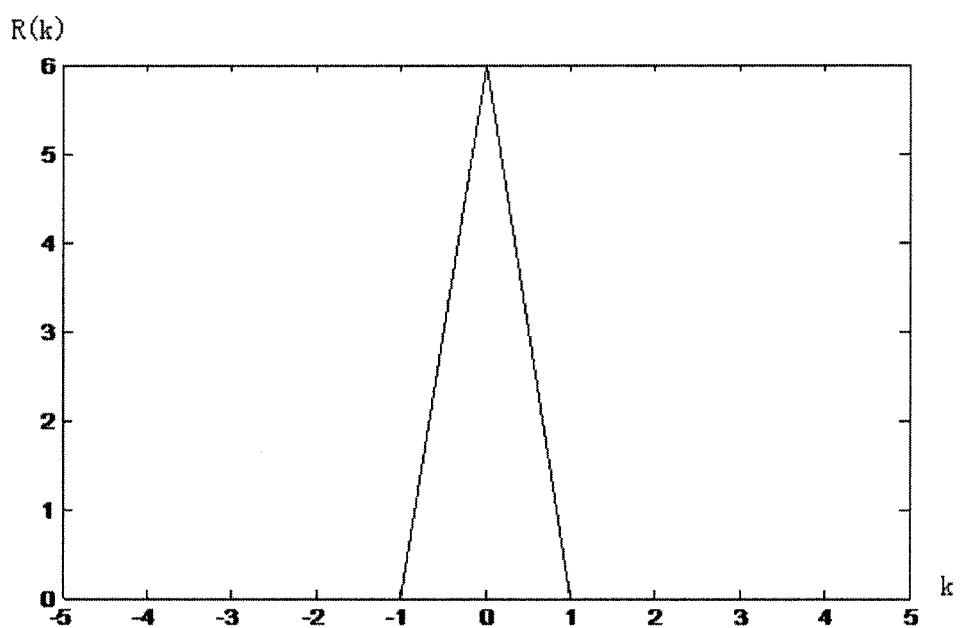
FIG. 4 is a diagram illustrating a correction result based on locally "−1's-to-0's" converted Barker codes.

In this embodiment of present disclosure, by converting original Barker codes, i.e., converting −1's in local Barker codes to 0's before performing a cyclic correlation on them, and thereafter cyclically correlating the converted local Barker codes with received Barker codes, non-complete-orthogonality in the correlation result can be eliminated without needing any further processing, as shown in FIG. 4, in which except for the bit where there is a peak which is 6, values at other bits are all 0, i.e., R(k) is 6 when k is equal to 0; and R(k) is 0 when k is equal to another value.

By converting locally stored Barker codes before performing a cyclic correlation on them, the method of the present invention is capable of obtaining a completely orthogonal correlation result, thus guaranteeing the accuracy of obtained channel estimation results.

Embodiment 3

This embodiment of present disclosure provides an apparatus for channel estimation which includes: a first Barker correlator 301, a second Barker correlator 302, a cyclic Barker correlator 303, a received data storage unit 304, a symbol determination module 305, a multiplication module 306 and a time-domain channel data storage unit 307;

the first Barker correlator is configured to correlate a previous Barker sequence stored on the received data storage unit with a locally stored original Barker sequence and output a first preamble symbol to the symbol determination module;

the second Barker correlator is configured to correlate a next Barker sequence stored on the received data storage unit with a locally stored original Barker sequence and output a second preamble symbol to the symbol determination module;

the symbol determination module is configured to compare the received first preamble symbol with the received second preamble symbol and output the comparison result to the multiplication module;

the cyclic Barker correlator is configured to cyclically correlate a part sequence extracted from the previous and the next Barker sequences stored on the received data storage with a converted Barker code and output the correlation result to the multiplication module; the converted Barker code is formed by converting $-1$'s in the locally stored original Barker code to $0$'s;

the multiplication module is configured to multiply the result output from the symbol determination module with the result output from the cyclic Barker correlator so as to obtain a channel estimation response and output the channel estimation response to the time-domain channel data storage unit; and the time-domain channel data storage unit is configured to average a plurality of obtained channel estimation responses to reduce the influence of noise.

In another embodiment of present disclosure, those processed in the first Barker correlator and the second Barker correlator are original Barker codes, and those processed in the cyclic Barker correlator are converted Barker codes.

By converting locally stored Barker codes before performing a cyclic correlation on them, the apparatus of the present disclosure is capable of obtaining a completely orthogonal correlation result, thus guaranteeing the accuracy of obtained channel estimation results.

Above described are nothing but several ways to carry out embodiments of the present invention. Those skilled in the art can make various variations and modifications to the embodiments without departing from the spirit or scope of the present invention. Thus, it shall be appreciated that the scope of the present invention shall not be limited to the embodiments and it is intended that the scope of the present invention is solely defined by the appended claims.

What is claimed is:

1. A channel estimation method, comprising:
    converting $-1$'s in a local Barker code to $0$'s to form a second Barker code, the local Barker code being stored on a cyclic Barker correlator;
    receiving, by a symbol determination module, a first preamble symbol output from a first Barker correlator and a second preamble symbol output from a second Barker correlator, the first preamble symbol being adjacent to the second preamble symbol;
    multiplying, by a multiplication module, a result output from the symbol determination module with a correlation result output from the cyclic Barker correlator so as to obtain a channel estimation response, and outputting, the channel estimation response to a time-domain channel data storage unit; and
    receiving, by the time-domain channel data storage unit, channel estimation responses output from the multiplication module, and averaging the channel estimation responses to obtain a noise-reduced channel estimation response.

2. The method according to claim 1, further comprising: correlating, by the first Barker correlator, a received previous Barker sequence with the local Barker code using formula, $$c_n = \sum_{k=0}^{L-1} b_k r_{n+k},$$

where L is the length of the local Barker code and L is equal to 11; $b_k$ ($k=0, 1, \ldots, L-1$) stands for the local Barker code; and $r_{n+k}$ ($k=0, 1, \ldots, L-1$) is the received previous Barker sequence.

3. The method according to claim 1, further comprising: correlating, by the second Barker correlator, a received next Barker sequence with the local Barker code using formula, $$c_{n+L} = \sum_{k=0}^{L-1} b_k r_{n+L+k},$$

where L is the length of the local Barker code and L is equal to 11; $b_k$ ($k=0, 1, \ldots, L-1$) stands for the local Barker code; and $r_{n+L+k}$ ($k=0, 1, \ldots, L-1$) is the received next Barker sequence.

4. The method according to claim 1, wherein, the result output from the symbol determination module is $0$, $+1$, or $-1$, which is determined in the following manner:
    when the first preamble symbol and the second preamble symbol are different from each other, the result output from the symbol determination module is $0$;
    when both of the first preamble symbol and the second preamble symbol are $-1$, the result output from the symbol determination module is $-1$; or
    when both of the first preamble symbol and the second preamble symbol are $+1$, the result output from the symbol determination module is $+1$.

5. The method according to claim 1, further comprising: cyclically correlating, by the cyclic Barker correlator, a part sequence extracted from a received previous Barker sequence and a received next Barker sequence with the second Barker code, which comprises:
    extracting the last n (where n is $0, 1, \ldots,$ or $L-1$) elements from the previous Barker sequence and the first $L-n$ elements from the next Barker sequence to form the part sequence which has the same length with a Barker code, the part sequence being denoted as $(r_0, r_1, \ldots, r_{L-1})$; and
    cyclically correlating, by the cyclic Barker correlator, the locally converted second Barker code with the part sequence $(r_0, r_1, \ldots, r_{L-1})$,
    wherein, the cyclic correlation is carried out using formula, $$h_n = \sum_{k=0}^{L-1} g_k r_{(k-n)mod(L)} (n = 0, 1, 2, \ldots, L-1),$$

where mod(L) stands for performing a modular operation on L; $g_k$ is the second Barker code which has been converted by the cyclic Barker correlator, and $g_k$=[+1 0 +1 +1 0 +1 +1 +1 0 0 0].

6. An apparatus for channel estimation, comprising:

a first Barker correlator, a second Barker correlator, a cyclic Barker correlator, a received data storage unit, a symbol determination module, a multiplication module and a time-domain channel data storage unit, wherein:

the first Barker correlator is configured to correlate a previous Barker sequence stored on the received data storage unit with a locally stored original Barker code and output a first preamble symbol to the symbol determination module;

the second Barker correlator is configured to correlate a next Barker sequence stored on the received data storage unit with the locally stored original Barker code and output a second preamble symbol to the symbol determination module;

the symbol determination module is configured to compare the received first preamble symbol with the received second preamble symbol and output the comparison result to the multiplication module;

the cyclic Barker correlator is configured to cyclically correlate a part sequence extracted from the previous and the next Barker sequences stored on the received data storage with a converted Barker code and output the correlation result to the multiplication module, the converted Barker code being formed by converting −1's in the locally stored original Barker code to 0's;

the multiplication module is configured to multiply the result output from the symbol determination module with the result output from the cyclic Barker correlator so as to obtain a channel estimation response and output the channel estimation response to the time-domain channel data storage unit; and the time-domain channel data storage unit is configured to average a plurality of obtained channel estimation responses to reduce the influence of noise therein.

\* \* \* \* \*